No. 730,548. PATENTED JUNE 9, 1903.
E. W. MACKENZIE-HUGHES.
WHEEL.
APPLICATION FILED JAN. 26, 1903.
NO MODEL.
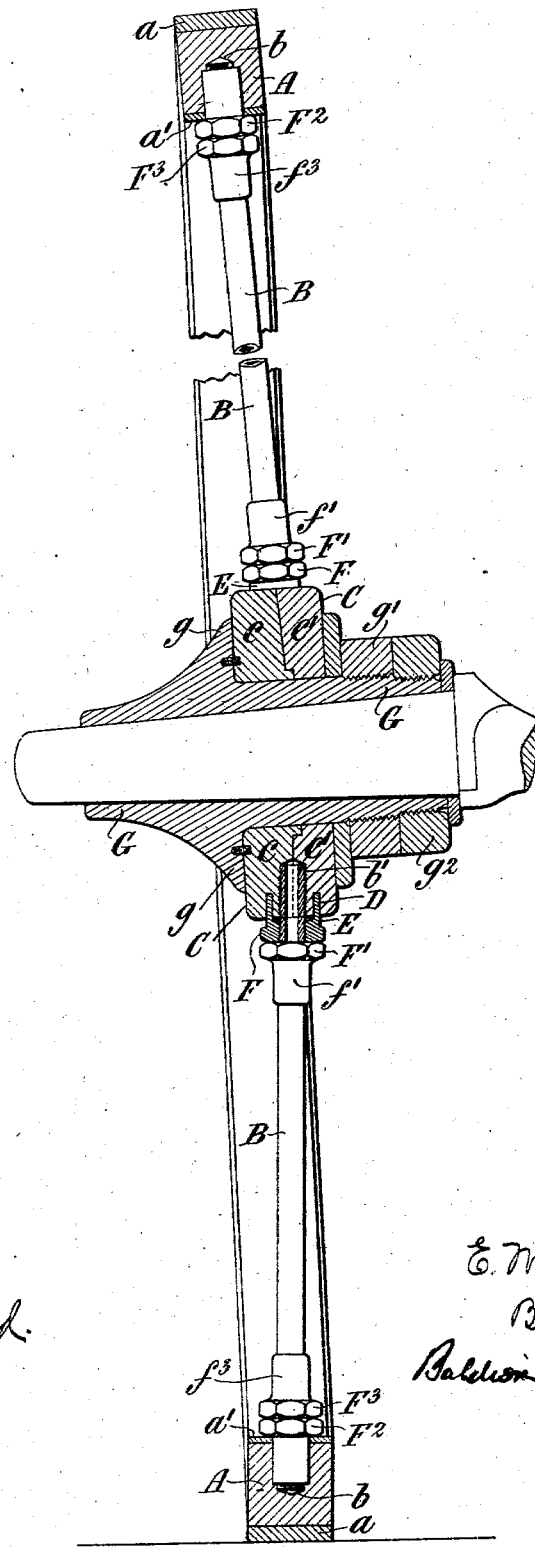
Witnesses.
A. M. Parkins.
J. A. MacDonald.
Inventor.
E. W. Mackenzie-Hughes,
By his Attorneys,
Baldwin Davidson Wight No. 730,548.

Patented June 9, 1903.

UNITED STATES PATENT OFFICE.

EDWARD WILLIAM MACKENZIE-HUGHES, OF WESTMINSTER, ENGLAND.

WHEEL.

SPECIFICATION forming part of Letters Patent No. 730,548, dated June 9, 1903.

Application filed January 26, 1903. Serial No. 140,634. (No model.)

*To all whom it may concern:*

Be it known that I, EDWARD WILLIAM MACKENZIE-HUGHES, engineer, a subject of the King of Great Britain, residing at 53 Victoria street, in the city of Westminster, England, have invented certain new and useful Improvements in Wheels, of which the following is a specification.

According to this invention the spokes are of metal and screw-threaded at both ends. One end of each fits into a radial hole in a rim or tire. It may be segmental wooden fellies, surrounded by a metal tire and strengthened by an inner metal ring, against which adjusting-nuts screwed onto the spokes are made to bear. The inner ends of the screw-spokes pass into radial tapped holes in the hub, one half of each hole being in one half of the hub, the other in the other. Annular slots are cut into the two parts of the hub concentrically with the radial holes. Tubes fitting into these slots hold the two parts of the hub together. Nuts screwed onto the inner end of the spokes are made to bear against the ends of the tubes. Suitable lock-nuts are provided. The sides of the rings forming the two halves of the hub are clamped between a shoulder or flange on a bush passing through the center of the rings and by a washer and a nut screwing onto the bush.

The figure is a section of a wheel very suitable for army purposes.

In the drawing, A is a segmental wooden rim provided with radial holes. $a$ is the metal tire, and $a'$ an inner metal strengthening-ring.

B represents hollow spokes provided with a screw-thread $b\ b'$ at each end.

C is the hub, provided with radial tapped grooves and formed of two parts $c\ c'$.

D represents annular slots concentric with the tapped grooves.

E represents tubes or ferrules fitting into the slots D.

F $F'$ $F^2$ $F^3$ are screw-nuts. The nut F may, as shown, be made in one piece with the tube or ferrule E. The nuts $F'$ and $F^3$ are provided with sleeves $f'\ f^3$ for protecting the screw-thread on the spoke.

G is a bush. $g$ is a shoulder or flange on said bush.

$g'$ $g^2$ are a nut and a locking-nut, respectively, which screw onto a thread on the bush G.

For the sake of lightness only a certain number—say every other one—of the slots D may be provided with ferrules E.

The wheel is built up as follows: The rim is laid flat on the ground and the spokes provided with their nuts and ferrules are screwed into it, their other ends being laid in the radial grooves in the part $c$ of the hub. The other part $c'$ of the hub is now put into position, and if the ferrules are separate from the nuts F they are pushed into the slots D and the adjusting-nuts F $F'$ $F^2$ $F^3$ are screwed up. If they are in one piece with the nuts, the screwing up of the latter forces them into place. The ferrules keep the parts of the wheel together and also keep the hub central. The wheel is now canted and the bush G placed in the center of the hub. The bush is prevented from rotating on the hub by any suitable means. The parts $c\ c'$ of the hub C are now firmly bolted together by being held between the flange or shoulder $g$ and the nut $g'$.

I have illustrated the invention with reference to a wheel suitable for army purposes; but it may be used with other types of wheels, such as motor-car wheels, &c.

I claim—

1. The combination of a hub made in two parts each part having radial grooves on one face, spokes fitting into the grooves, tubes or ferrules fitting into annular slots concentric with said radial grooves, and means for maintaining said tubes or ferrules in the annular slots.

2. The combination of a hub made in two parts each part having radial grooves on one face, spokes fitting into the grooves, tubes or ferrules fitting into annular slots concentric with said radial grooves, means for maintaining said tubes or ferrules in the annular slots, a bush concentric with said hub, a flange on said bush, and means for maintaining one side of the hub against said flange.

3. The combination of a hub made in two parts each part having tapped radial grooves on one face, spokes provided with a screw-thread fitting into the tapped grooves, and means for holding the two parts of the hub together.

4. The combination of a hub made in two parts each part having tapped radial grooves on one face, spokes provided with a screw-thread fitting into the tapped grooves, tubes or ferrules fitting into annular slots concentric with said radial grooves, and means for maintaining said tubes or ferrules in the annular slots.

5. The combination of a rim having radial holes in it, a hub made in two parts each part having tapped radial grooves on one face, spokes screw-threaded at both ends, one end fitting into the radial holes in the rim and the other into the tapped grooves of the hub, and means for holding the two parts of the hub together.

6. The combination of a rim having radial holes in it, a hub made in two parts each part having tapped radial grooves on one face, spokes screw-threaded at both ends, one end fitting into the radial holes in the rim and the other into the tapped grooves of the hub, tubes or ferrules fitting into annular slots concentric with said radial grooves, screw-nuts for maintaining said tubes or ferrules in said slots, and screw-nuts for fixing said spokes in the radial holes of the rim.

EDWARD WILLIAM MACKENZIE-HUGHES.

Witnesses:
WILLIAM HENRY MARSDEN BURFORD,
RICHARD HARE.